(12) United States Patent
Fang et al.

(10) Patent No.: US 9,268,723 B2
(45) Date of Patent: Feb. 23, 2016

(54) DRAM COMPRESSION SCHEME TO REDUCE POWER CONSUMPTION IN MOTION COMPENSATION AND DISPLAY REFRESH

(75) Inventors: Zhen Fang, Austin, TX (US); Nitin Gupte, Beaverton, OR (US); Xiaowei Jiang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 32 days.

(21) Appl. No.: 13/995,575

(22) PCT Filed: Dec. 21, 2011

(86) PCT No.: PCT/US2011/066556
§ 371 (c)(1),
(2), (4) Date: Mar. 31, 2014

(87) PCT Pub. No.: WO2013/095448
PCT Pub. Date: Jun. 27, 2013

(65) Prior Publication Data
US 2014/0204105 A1    Jul. 24, 2014

(51) Int. Cl.
| | | |
|---|---|---|
| G09G 5/39 | (2006.01) | |
| G06T 1/60 | (2006.01) | |
| G06F 13/16 | (2006.01) | |
| H04N 9/804 | (2006.01) | |
| H04N 19/426 | (2014.01) | |
| H04N 19/91 | (2014.01) | |
| H04N 19/44 | (2014.01) | |

(52) U.S. Cl.
CPC .............. *G06F 13/1673* (2013.01); *G06T 1/60* (2013.01); *H04N 9/8042* (2013.01); *H04N 19/428* (2014.11); *H04N 19/44* (2014.11); *H04N 19/91* (2014.11)

(58) Field of Classification Search
None
See application file for complete search history.

(56) References Cited

U.S. PATENT DOCUMENTS 5,668,599 A    9/1997   Cheney et al.
5,812,791 A *  9/1998   Wasserman et al. .......... 709/247
(Continued)

FOREIGN PATENT DOCUMENTS

| CN | 1106117 C | 4/2003 |
| EP | 0782345 A2 | 7/1997 |
| JP | 08-116539 A | 5/1996 |
| JP | 2010-141771 A | 6/2010 |

(Continued)

OTHER PUBLICATIONS

International Preliminary Report on Patentability and Written Opinion received for PCT Patent Application No. PCT/US2011/066556, mailed on Jul. 3, 2014, 6 pages.

(Continued)

*Primary Examiner* — Jacinta M Crawford
(74) *Attorney, Agent, or Firm* — Jordan IP Law, LLC

(57) ABSTRACT

Systems and methods of operating a memory controller may provide for receiving a write request from a motion compensation module, wherein the write request includes video data. A compression of the video data may be conducted to obtain compressed data, wherein the compression of the video data is transparent to the motion compensation module. In addition, the compressed data can be stored to one or more memory chips. Moreover, a read request may be received, wherein stored data is retrieved from at least one of the one or more memory chips in response to the request. Additionally, a decompression of the stored data may be conducted to obtain decompressed data.

21 Claims, 5 Drawing Sheets

(56) References Cited

U.S. PATENT DOCUMENTS

| | | | |
|---|---|---|---|
| 5,847,762 | A | 12/1998 | Canfield et al. |
| 6,157,740 | A * | 12/2000 | Buerkle et al. ............... 382/233 |
| 6,278,735 | B1 | 8/2001 | Mohsenian |
| 6,510,178 | B1 | 1/2003 | Fimoff et al. |
| 6,628,714 | B1 | 9/2003 | Fimoff et al. |
| 7,333,036 | B2 | 2/2008 | Oh et al. |
| 2002/0176507 | A1 * | 11/2002 | Ju ........................... 375/240.25 |
| 2004/0146213 | A1 * | 7/2004 | Park et al. ................... 382/236 |
| 2007/0230572 | A1 * | 10/2007 | Koto et al. ............... 375/240.12 |

FOREIGN PATENT DOCUMENTS

| | | |
|---|---|---|
| JP | 2011-139175 A | 7/2011 |
| KR | 100484333 | 7/2005 |
| TW | 404132 B | 9/2000 |
| WO | 2013/95448 A1 | 6/2013 |

OTHER PUBLICATIONS

Office Action received for Japanese Patent Application No. 2012-277881, mailed on Dec. 3, 2013, 3 pages of Office Action and 4 pages of English Translation.

International Search Report and Written Opinion received for PCT application No. PCT/US2011/066556, mailed on Sep. 12, 2012, 9 Pages.

Peter H.N. et al., "An MPEG Decoder with Embedded Compression for Memory Reduction", IEEE Transactions on Consumer Electronics, Aug. 1, 1998, pp. 545-554, vol. 44, No. 3, University of Mannheim, Germany.

Madhukar Budagavi et al., "Description of Video Coding Technology Proposal by Texas Instruments Inc." JCTVC-A101, Apr. 16, 2010, 45 pages, Texas Instruments Inc., USA.

Keiichi Chono et al., "Rounding-Error Conscious Memory Compression Method for IBDI", JCTVC-D045, Jan. 15, 2011, 6 pages, NEC Corporation, Korea.

Supplementary European Search Report for European Patent Application 11878021.2, dated Apr. 17, 2015, 10 pages.

Office Action for Korean Application No. 2014-7016821, dated Apr. 29, 2015, 10 pages, Including 5 pages of English translation.

Office Action for Taiwanese Application No. 101148342, dated Apr. 1, 2015, 15 pages, Including 9 pages of English translations.

* cited by examiner

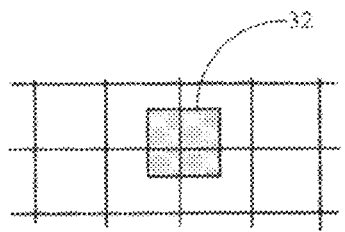
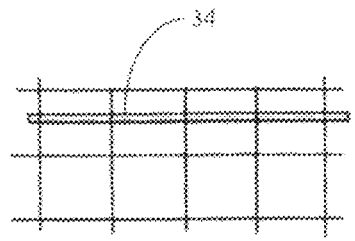
FIG. 2A            FIG. 2B
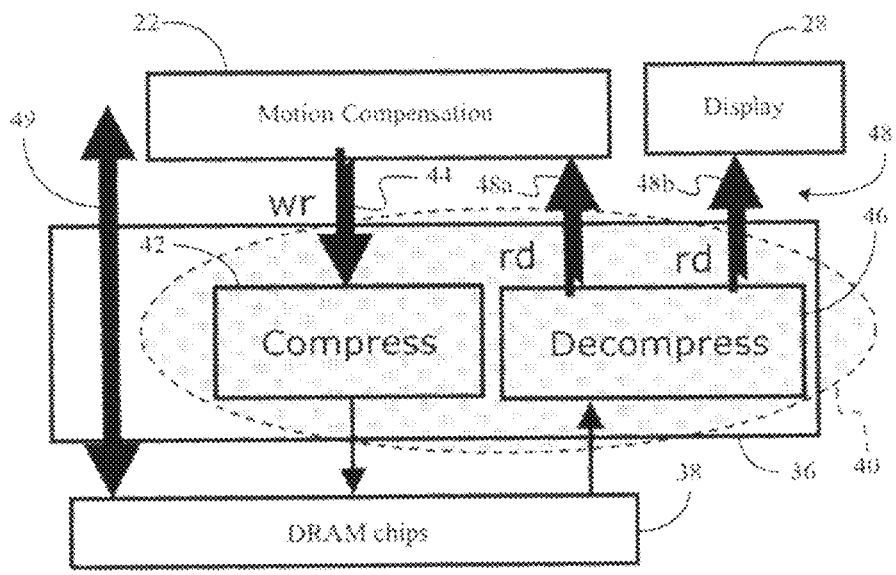
FIG. 3
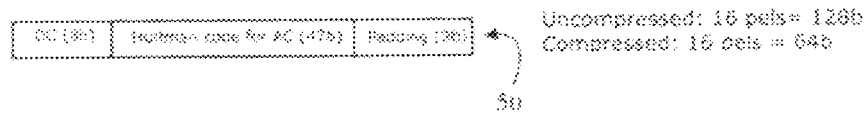
FIG. 4

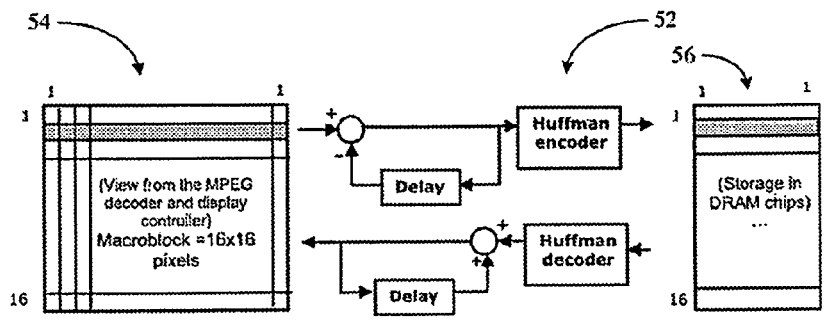
FIG. 5
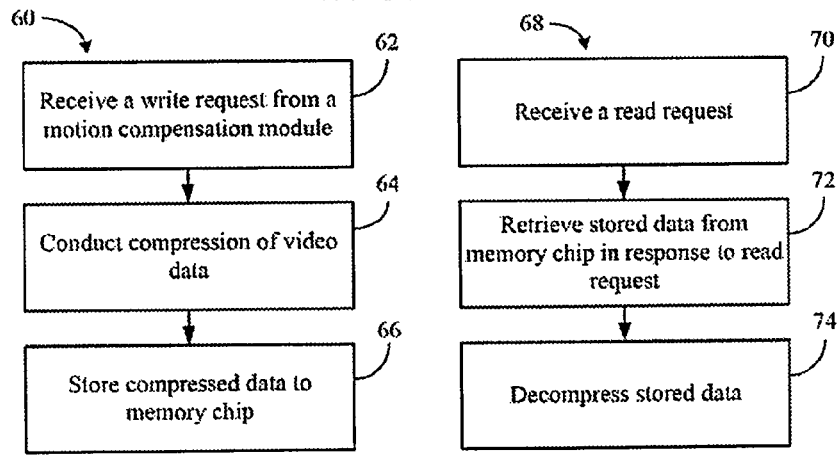
FIG. 6A  FIG. 6B
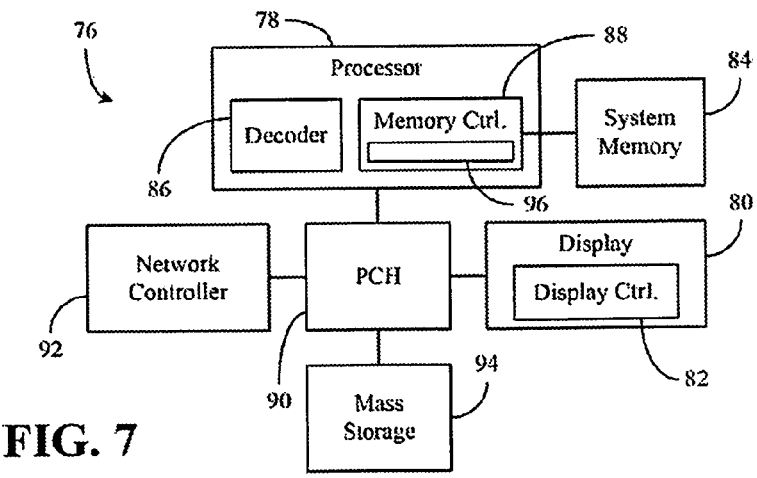
FIG. 7

DRAM COMPRESSION SCHEME TO REDUCE POWER CONSUMPTION IN MOTION COMPENSATION AND DISPLAY REFRESH

BACKGROUND

Certain mobile devices may be able to playback video from various sources. A typical mobile device video playback solution may involve the use of motion compensation techniques to decode video data prior to storing the data to a DRAM (dynamic random access memory) frame buffer, wherein a display controller might process the frame buffer data for output to a display device. Conventional attempts to reducing the memory footprint of data used for motion compensation operations may have a negative impact on display memory power efficiency. Conventional display memory power reduction techniques, on the other hand, may present challenges from a video decoding perspective.

BRIEF DESCRIPTION OF THE DRAWINGS

The various advantages of the embodiments of the present invention will become apparent to one skilled in the art by reading the following specification and appended claims, and by referencing the following drawings, in which:

FIG. 2A is a block diagram of an example of a motion compensation frame buffer access order according to an embodiment;

FIG. 2B is a block diagram of an example of a display output frame buffer access order according to an embodiment;

FIG. 3 is a block diagram of an example of a memory controller according to an embodiment;

FIG. 4 is an illustration of an example of a compression scheme according to an embodiment;

FIG. 5 is a block diagram of an example of a compression/decompression architecture according to an embodiment;

FIG. 6A is a flowchart of an example of a method of processing memory write requests according to an embodiment;

FIG. 6B is a flowchart of an example of a method of processing memory read requests according to an embodiment;

FIG. 7 is a block diagram of an example of a system according to an embodiment;

DETAILED DESCRIPTION

Embodiments may include a memory controller having a compression module to receive a write request from a motion compensation module, wherein the write request includes video data. The compression module may also conduct a compression of the video data to obtain compressed data, and store the compressed data to one or more memory chips. In one example, the memory controller also has a decompression module.

Embodiments can also include a system having a display, one or more memory chips, and a processor chip with a motion compensation module and a memory controller. The memory controller may include a compression module to receive a write request from the motion compensation module, wherein the write request includes video data. In addition, the compression module can conduct a compression of the video data to obtain compressed data, and store the compressed data to at least one of the one or more memory chips.

Other embodiments may involve a computer implemented method of operating a memory controller in which a write request is received from a motion compensation module. The write request can include video data, wherein the method further includes conducting a compression of the video data to obtain compressed data, and storing the compressed data to one or more memory chips.

Additionally, embodiments may involve a computer implemented method of operating a memory controller in which a write request is received from a motion compensation module. The write request can include video data, wherein the method further includes conducting a compression of the video data to obtain compressed data. The compression of the video data may be transparent to the motion compensation module. The method can further provide for storing the compressed data to one or more memory chips, and receiving a read request. Stored data can be retrieved from at least one of the one or more memory chips in response to the read request. Moreover, a decompression of the stored data may be conducted to obtain decompressed data. In one example, the decompression is transparent to a requestor of the stored data.

Figure 1A:
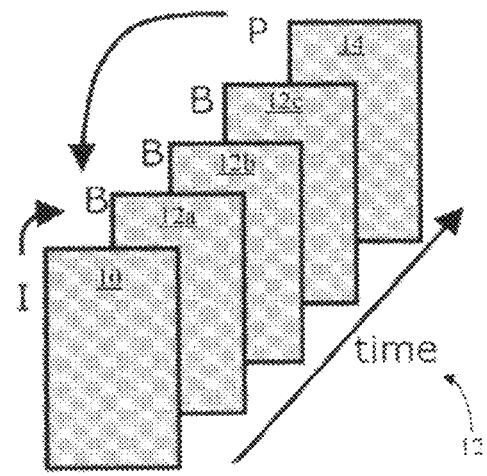
FIG. 1A is a block diagram of an example of frame data associated with a video decoding operation according to an embodiment.
Figure 1B:
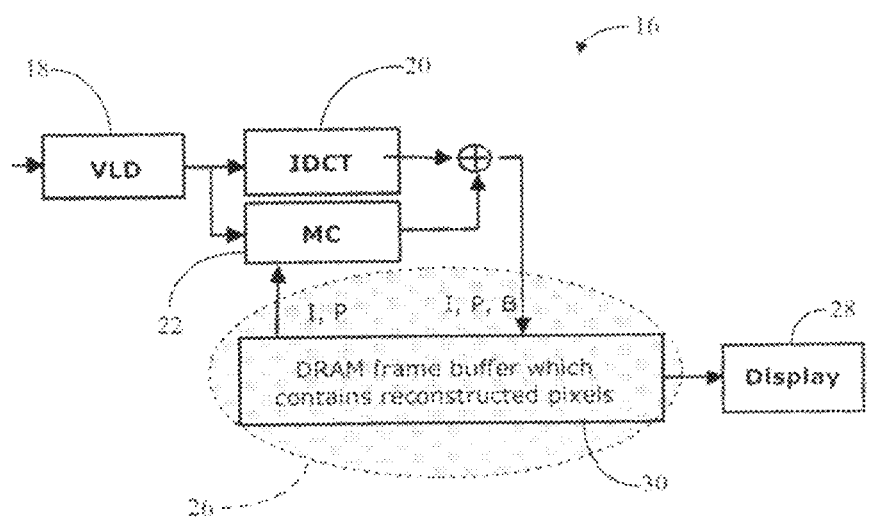
FIG. 1B is a block diagram of an example of the use of frame data in a video playback architecture according to an embodiment.

Turning now to FIGS. 1A and 1B, a set of frame data and a video playback architecture 16 are shown, respectively, for video content being decoded on a platform such as a mobile device. In particular, a memory system 26 of the architecture 16 can include a DRAM frame buffer 30 that contains reconstructed pixels, which are retrieved by a display controller (not shown) and output to a display 28 according to a video protocol such as, for example, the MPEG2 (e.g., Moving Picture Experts Group 2) protocol. In the illustrated example, the frame data includes an I-frame (intra coded frame) 10, a set of B-frames (bi-directional predicted frames) 12 (12a-12c), and a P-frame (predicted frame) 14. Each B-frame 12 can be decoded using the I-frame 10 as a reference that occurs earlier in time, and using the P-frame 14 as a reference that occurs later in time. Thus, reconstructing the B-frames 12 may be relatively memory intensive due to the need to repeatedly access both the I-frame 10 and the P-frame 14 data from the memory system 26.

For example, the video playback architecture 16 may include a variable length decoder ("VLD") 18 that supplies decoded video data to both an inverse discrete cosine transform ("IDCT") module 20 and a motion compensation ("MC") module 22, wherein the MC module 22 may reconstruct frames one macroblock (e.g., 16×16 pixels) at a time using motion vectors that are essentially pixel coordinate pointers to the reference frames (e.g., I-frame and P-frame). As will be discussed in greater detail, techniques described herein enable more efficient accesses to the frame buffer 30 from the perspective of both the MC module 22 and the display 28, wherein the enhanced memory efficiency may enable reduced power consumption and increased battery life.

FIGS. 2A and 2B show frame buffer access orders from the perspective of a motion compensation module and a display, respectively. In particular, the illustrated frame buffer access order for the motion compensation module is on a macroblock 32 basis, whereas the frame buffer access order for the display may be on a row 34 basis. Thus, a mismatch may exist between the two access orders that can present difficulties that are obviated by the techniques described herein.

In particular, FIG. 3 shows a memory controller 36 that manages the transfer of video data to and from one or more DRAM chips 38, wherein the DRAM chips 38 may be used to implement a frame buffer such as the frame buffer 30 (FIG. 1B), already discussed. In the illustrated example, the memory controller 36 includes video efficiency logic 40 having a compression module 42 to process write requests 44 from (either directly or indirectly) the motion compensation module 22, and a decompression module 46 to process read requests 48 (48a, 48b) from (either directly or indirectly) the motion compensation module 22 and the display 28. Thus, the write requests 44 from the motion compensation module 22 and the read requests 48b from the display 28 may involve the transfer of I-frame 10, B-frame 12 and P-frame 14 (FIG. 1A) video data, whereas the read requests 48a from the motion compensation module 22 could involve the transfer of I-frame 10 and P-frame 14 (FIG. 1A) data (e.g., as reference frames).

The illustrated compression module 42 is configured to receive the write requests 44 from the motion compensation module 22, conduct a compression of the video data associated with the write requests 44, and write the compressed data to the DRAM chips 38, as appropriate. Thus, the compression module 42 might compress the I-, B- and P-frames received from the motion compensation module 22 on a macroblock-by-macroblock basis, wherein the compression may be transparent to the motion compensation module 22.

FIG. 4 shows one approach to conducting the compression, wherein differential pulse code modulation (DPCM) and Huffman coding processes are used. In particular, a macroblock row of sixteen luminance values (e.g., expressed in 16 bytes) can be expressed as DPCM "slopes", which may in turn be converted to a set of DPCM "slope deltas". The Huffman coding process may therefore generate a code 50 that is compressed by 50%. If more than 50% compression is desired, one or more trailing AC (e.g., alternating current, non-zero frequency) DCT coefficients may be truncated to obtain lossy compression, wherein the truncation may be rare and might not be perceivable to non-professional viewers.

Returning to FIG. 3, the illustrated decompression module 46 is configured to receive the read requests 48 from the motion compensation module 22 and the display, retrieve stored data from the DRAM chips 38 in response to the read requests 48, and conduct a decompression of the stored/retrieved data to obtain decompressed data. If the decompressed data corresponds to a read request 48a from the motion compensation module 22, the decompressed data may be transferred to the motion compensation module 22, wherein the decompression of the stored data is transparent to the motion compensation module 22, in the example shown. If the decompressed data corresponds to a read request 48b (e.g., display refresh) from the display 28, the decompressed data may be transferred to the display 28, wherein the decompression of the stored data is transparent to the display 28, in the example shown. The decompression process may essentially be the reverse of the compression process. The memory controller 36 may also support other non-playback related transfers 49 to and from the DRAM chips 38.

FIG. 5 shows a compression architecture 52 in which a virtual view 54 of the memory architecture from the perspective of the motion compensation module and the display is the data being stored and retrieved in macroblocks. An actual view 56 of the memory architecture, however, reflects that the video data may use significantly less memory. The reduced amount of memory usage can in turn provide substantial savings in power consumption related to memory accesses. Of particular note is that the illustrated approach does not require extra buffers in the DRAM or extra memory copy operations. Thus, implementing the illustrated solution in the memory controller may enable greater memory access efficiency, while the solution can remain transparent to system components other than the memory architecture itself.

FIG. 6A shows a method 60 of processing write requests. The method 60 may be implemented in a memory controller as a set of logic instructions stored in a machine- or computer-readable storage medium such as RAM, read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 60 may be written in any combination of one or more programming languages, including an object oriented programming language such as C++ or the like and conventional procedural programming languages, such as the "C" programming language or similar programming languages. Moreover, the method 60 could be implemented using any of the aforementioned circuit technologies.

Illustrated processing block 62 provides for receiving a write request from a motion compensation module, wherein the write request can include video data. Block 64 may conduct a compression of the video data to obtain compressed data, wherein the compression of the video data is transparent to the motion compensation module. The compressed data may be stored to one or more memory chips at block 66.

FIG. 6B shows a method 68 of processing read requests. The method 60 may be implemented in a memory controller as a set of logic instructions stored in a machine- or computer-readable storage medium such as RAM, ROM, PROM, flash memory, etc., in configurable logic such as, for example, PLAs, FPGAs, CPLDs, in fixed-functionality logic hardware using circuit technology such as, for example, ASIC, CMOS or transistor-transistor logic (TTL) technology, or any combination thereof. Illustrated processing block 70 provides for receiving a read request from a system component such as a motion compensation module or display controller. Stored data may be retrieved from at least one of the memory chips at block 72, wherein block 74 may conduct a decompression of the stored data. The decompressed data may then be transferred to the requestor of the data.

Turning now to FIG. 7, a video-enabled computing system 76 is shown in which memory controller-based compression and decompression are implemented. The computing system 76 may be part of a mobile platform such as, for example, a laptop, PDA, wireless smart phone, media player, imaging device, MID, any smart device such as a smart phone, smart tablet and so forth, or any combination thereof. The computing system 76 may also be part of a fixed platform such as a personal computer (PC), smart TV, server, workstation, etc. The illustrated computing system 76 includes one or more processors 78, a display device 80 having a display controller 82, and system memory 84, which could include, for example, double data rate (DDR) synchronous DRAM (SDRAM, e.g., DDR3 SDRAM JEDEC Standard JESD79-3C, April 2008) modules. The modules of the system memory 84 may be incorporated into one or more chips associated with a single inline memory module (SIMM), dual inline memory module (DIMM), small outline DIMM (SODIMM), and so forth.

The processor 78 may have a video decoder 86 and an integrated memory controller 88, and one or more processor cores (not shown) to execute one or more drivers associated with a host OS (operating system) and/or application software, wherein each core may be fully functional with instruction fetch units, instruction decoders, level one (L1) cache, execution units, and so forth. The processor 78 could alternatively communicate with an off-chip variation of the memory controller 88, also known as a Northbridge, via a front side bus. The illustrated processor 78 communicates with a platform controller hub (PCH) 90, also known as a Southbridge, via a hub bus. The memory controller 88/processor 78 and the PCH 90 are sometimes referred to as a chipset. The PCH may be coupled to a network controller 92 and/or mass storage 94 (e.g., hard disk drive/HDD, optical drive, etc.).

The illustrated memory controller 88 includes efficiency logic 96 such as the efficiency logic 40 (FIG. 3), already discussed. Thus, the memory controller 88 may be configured to receive write requests from a motion compensation module (not shown) of the decoder 86, compress the video data associated with the write requests, and store the compressed data to the system memory 84. In addition, the memory controller 88 may be configured to receive read requests from the motion compensation module of the decoder 86 and the display controller 82, retrieve stored data from the system memory 84 in response to the read requests, and decompress the retrieved data before transferring the decompressed data to the requestor. The compression and decompression processes may be transparent to all system components other than the memory controller 88 and the system memory 84.

Figure 8:
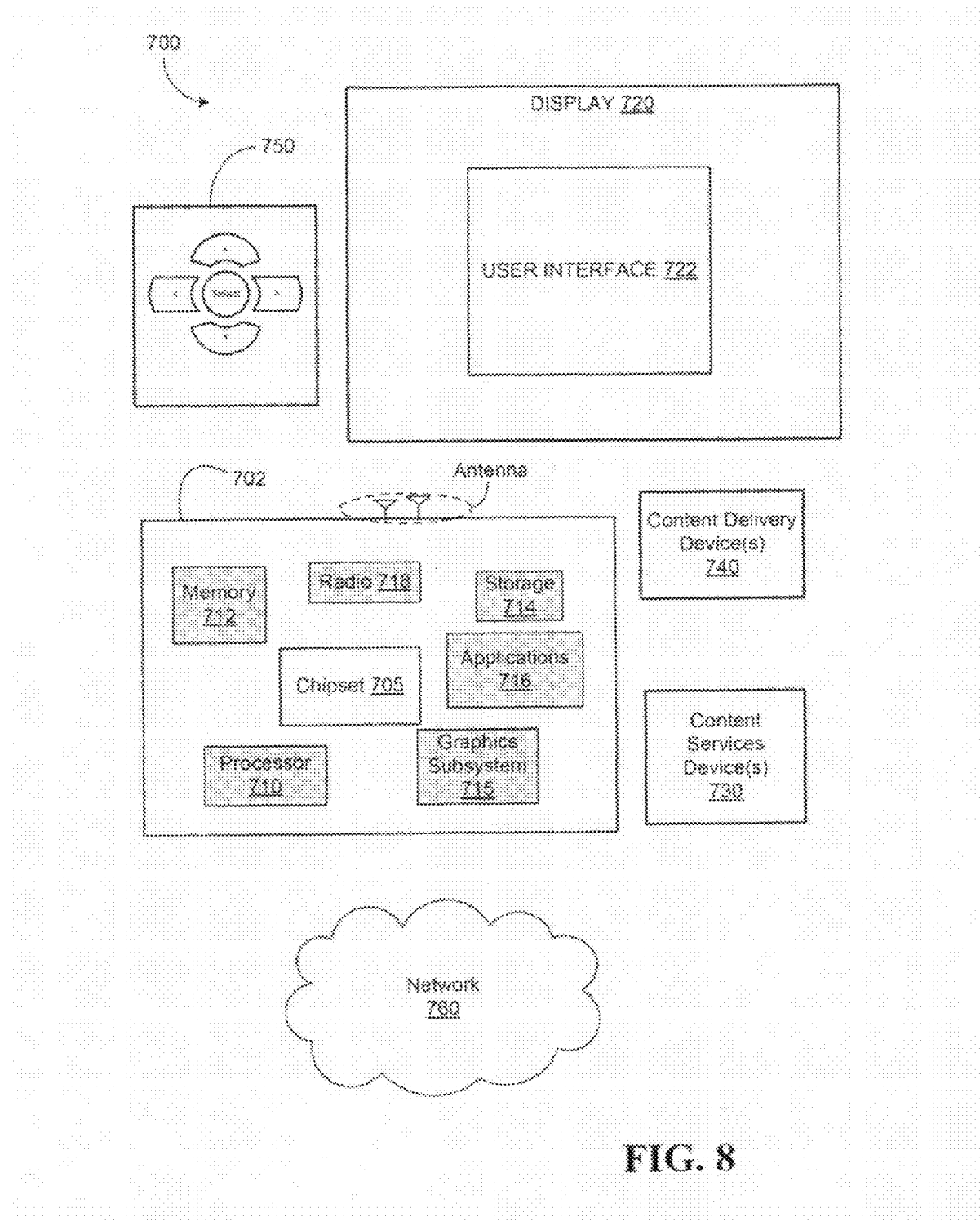
FIG. 8 is a block diagram of an example of a system having a navigation controller according to an embodiment.

FIG. 8 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
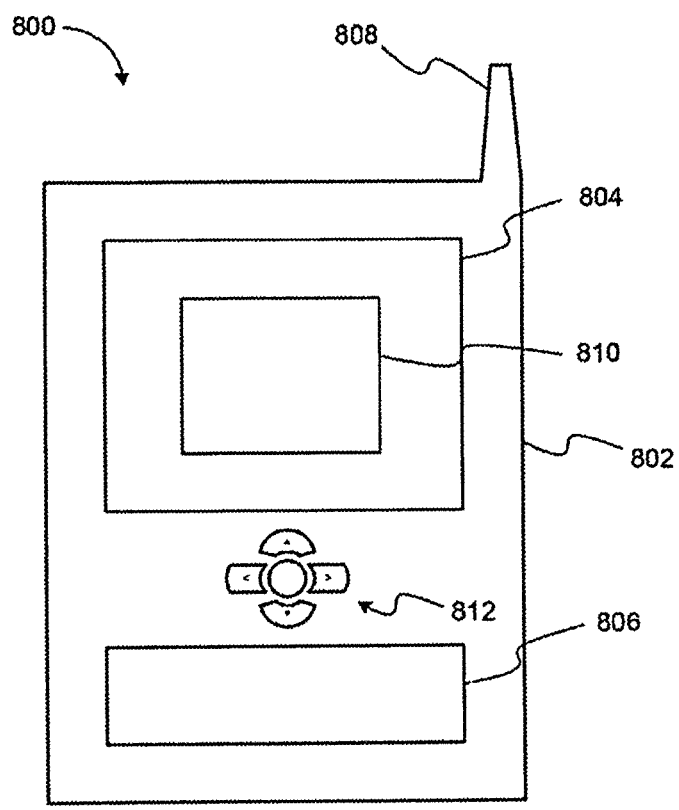
FIG. 9 is a block diagram of an example of a system having a small form factor according to an embodiment.

As described above, system 700 may be embodied in varying physical styles or form factors. FIG. 9 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable L/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Techniques described herein may therefore provide a feed-forward system that ensures both real-time operation of the consumer video pipeline and dynamic updating of the operating pipeline to deliver optimal visual perceptual quality and viewing experience. In particular, a discrete control system for the video pipeline can dynamically adapt operating points in order to optimize a global configuration of interactive component modules that are related to video perceptual quality. In a series configuration, the perceptual quality analysis module may be placed before the video processing pipeline and parameters determined for the post-processing pipeline may be used for the same frame. In the case of distributed computation of the quality analysis block or when perceptual quality analysis needs to be performed at intermediate points in the pipeline, the parameters determined using a given frame may be applied on the next frame to ensure real-time operation. Distributed computation is sometimes beneficial in reducing complexity as certain elements for perceptual quality computation may already be computed in the post-processing pipeline and can be re-used. Illustrated approaches may also be compatible with closed-loop control where the perceptual quality analysis is re-used at the output of the video processing pipeline to estimate output quality, which is also used by the control mechanism.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and to discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer implemented method of operating a memory controller comprising:
   receiving a write request from a motion compensation module, wherein the write request includes video data and is receivable by the memory controller both directly and indirectly from the motion compensation module;
   conducting a compression of the video data to obtain compressed data, wherein the compression of the video data is transparent to the motion compensation module;
   storing the compressed data to one or more memory chips;
   receiving a read request;
   retrieving stored data from at least one of the one or more memory chips in response to the read request; and
   conducting a decompression of the stored data to obtain decompressed data, wherein the read request is capable of being processed both directly and indirectly from the motion compensation module and a display.

2. The method of claim 1, wherein the read request is received from the motion compensation module, wherein the method further includes transferring the decompressed data to the motion compensation module, and wherein the decompression of the stored data is transparent to the motion compensation module.

3. The method of claim 1, wherein the read request is received from a display controller, wherein the method further includes transferring the decompressed data to the display controller, and wherein the decompression of the stored data is transparent to the display controller.

4. The method of claim 1, further including using one or more of a differential pulse code modulation process and a Huffman process to conduct the compression of the video data and the decompression of the stored data.

5. A memory controller comprising:
   a compression module to,
      receive a write request from a motion compensation module, wherein the write request includes video data and is receivable by the memory controller both directly and indirectly from the motion compensation module,
      conduct a compression of the video data to obtain compressed data, and
      store the compressed data to one or more memory chip; and
   a decompression module to,
      receive a read request,
      retrieve stored data from at least one of the one or more memory chips in response to the read request, and
      conduct a decompression of the stored data to obtain decompressed data, wherein the read request is capable of being processed both directly and indirectly from the motion compensation module and a display.

6. The memory controller of claim 5, wherein the compression of the video data is transparent to the motion compensation module.

7. The memory controller of claim 5, wherein the read request is received from the motion compensation module, wherein the decompression module transfers the decompressed data to the motion compensation module, and wherein the decompression of the stored data is transparent to the motion compensation module.

8. The memory controller of claim 5, wherein the read request is received from a display controller, wherein the decompression module transfers the decompressed data to the display controller, and wherein the decompression of the stored data is to be transparent to the display controller.

9. The memory controller of claim 5, wherein the memory controller resides on a chip other than the one or more memory chips.

10. The memory controller of claim 9, wherein the chip other than the one or more memory chips is to include the motion compensation module.

11. The memory controller of claim 5, wherein the compression module uses one or more of a differential pulse code modulation process and a Huffman process to conduct the compression of the video data.

12. A system comprising:
   a display;
   one or more memory chips; and
   a processor chip including a motion compensation module and a memory controller, the memory controller having:
      a compression module to,
         receive a write request from the motion compensation module, wherein the write request includes video data and wherein the write request is receivable both directly and indirectly from the motion compensation module,
         conduct a compression of the video data to obtain compressed data, and
         store the compressed data to at least one of the one or more memory chips; and a decompression module to,
   receive a read request,
   retrieve stored data from at least one of the one or more memory chips, and
   conduct a decompression of the stored data to obtain decompressed data, wherein the read request is capable of being processed both directly and indirectly from the motion compensation module and the display.

13. The system of claim 12, wherein the compression of the video data is transparent to the motion compensation module.

14. The system of claim 12, wherein the read request is received from the motion compensation module, wherein the decompression module transfers the decompressed data to the motion compensation module, and wherein the decompression of the stored data is transparent to the motion compensation module.

15. The system of claim 12, further including a display controller coupled to the display and the processor chip, wherein the read request is received from the display controller, wherein the decompression module transfers the decompressed data to the display controller, and wherein the decompression of the stored data is transparent to the display controller.

16. The system of claim 12, wherein the compression module uses one or more of a differential pulse code modulation process and a Huffman process to conduct the compression of the video data.

17. A computer implemented method of operating a memory controller comprising:
   receiving a write request from a motion compensation module, wherein the write request includes video data and is receivable by the memory controller either directly and indirectly from the motion compensation module;
   conducting a compression of the video data to obtain compressed data;
   storing the compressed data to one or more memory chips;
   receiving a read request;
   retrieving stored data from at least one of the one or more memory chips in response to the read request; and
   conducting a decompression of the stored data to obtain decompressed data, wherein the read request is capable of being processed both directly and indirectly from the motion compensation module and the display.

18. The method of claim 17, wherein the compression of the video data is transparent to the motion compensation module.

19. The method of claim 17, wherein the read request is received from the motion compensation module, wherein the method further includes transferring the decompressed data to the motion compensation module, and wherein the decompression of the stored data is transparent to the motion compensation module.

20. The method of claim 17, wherein the read request is received from a display controller, wherein the method further includes transferring the decompressed data to the display controller, and wherein the decompression of the stored data is transparent to the display controller.

21. The method of claim 17, further including using one or more of a differential pulse code modulation process and a Huffman process to conduct the compression of the video data.

* * * * *